United States Patent [19]

McClain

[11] Patent Number: 5,121,775

[45] Date of Patent: Jun. 16, 1992

[54] PORTABLE APPARATUS FOR FILLING BAGS WITH MATERIAL TO A PRESELECTED WEIGHT

[75] Inventor: Raymond L. McClain, Tulsa, Okla.

[73] Assignee: Ray McClain, Inc., Tulsa, Okla.

[21] Appl. No.: 660,760

[22] Filed: Feb. 25, 1991

[51] Int. Cl.⁵ .................................................. B65B 3/04
[52] U.S. Cl. ...................................... 141/83; 177/98; 141/114; 141/313; 141/231
[58] Field of Search .................. 141/10, 83, 114, 231, 141/248, 313; 177/98, 102, 105, 111, 112, 250

[56] References Cited

U.S. PATENT DOCUMENTS

| | | | |
|---|---|---|---|
| 686,195 | 11/1901 | Barthelness | 141/248 X |
| 872,161 | 11/1907 | Whitehorn | 141/248 X |
| 1,849,256 | 3/1932 | Trovaton | 177/98 |
| 2,051,565 | 8/1936 | Marsh et al. | 141/248 |
| 2,625,361 | 1/1953 | Schrock | 177/98 |
| 2,699,891 | 1/1955 | Kellicott | 141/248 X |
| 2,988,368 | 6/1961 | Kerr . | |
| 3,288,177 | 11/1966 | Clark | 141/248 X |
| 3,552,346 | 1/1971 | Gordon | 141/72 |
| 3,817,340 | 6/1974 | Peasnall | 177/98 X |
| 3,872,784 | 3/1975 | Kaszuba et al. | 141/248 X |
| 4,344,823 | 8/1982 | Stratmann et al. | 141/248 X |
| 4,585,041 | 4/1986 | Cavanagh | 141/231 |
| 4,615,363 | 10/1986 | Baker | 141/248 X |
| 4,763,702 | 8/1988 | High, Jr. et al. | 141/114 |
| 4,819,701 | 4/1989 | Thornton | 141/231 |
| 5,022,444 | 6/1991 | Kendall et al. | 141/248 |

FOREIGN PATENT DOCUMENTS 833540 4/1960 United Kingdom ................ 141/248
356015 9/1971 United Kingdom ................ 177/98

OTHER PUBLICATIONS

Exhibit A—Auger Bag Filler.

Primary Examiner—Ernest G. Cusick
Attorney, Agent, or Firm—Kirkpatrick & Lockhart

[57] ABSTRACT

A bag filling apparatus includes a hopper for receiving raw material. The hopper feeds the material through an opening to a conveyor belt for transporting the material to a bagging head. The bagging head includes a gate having two positions for selectively diverting the material to one of a first and a second outlet ports. Underneath the bagging head is a receiving scale having a first pan and a second pan, each adapted to hold a bag for receiving the material, and a movable counterweight. The scale is constructed to move between two positions: a first position wherein the first pan is adjacent the first outlet port and the counterweight is adjacent the second pan and a second position wherein the second pan is adjacent the second outlet port and the counterweight is adjacent the first pan. The movement of receiving scale between the two positions occurs automatically when the sandbag reaches a preselected weight. An actuator mechanism is responsive to the first and second positions to operate the gate so that material is selectively diverted to the outlet port which has a pan adjacent thereto.

6 Claims, 7 Drawing Sheets

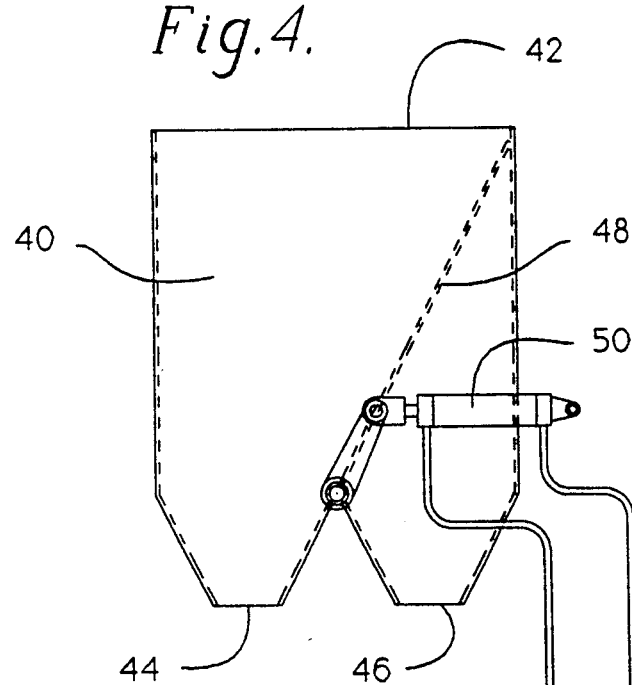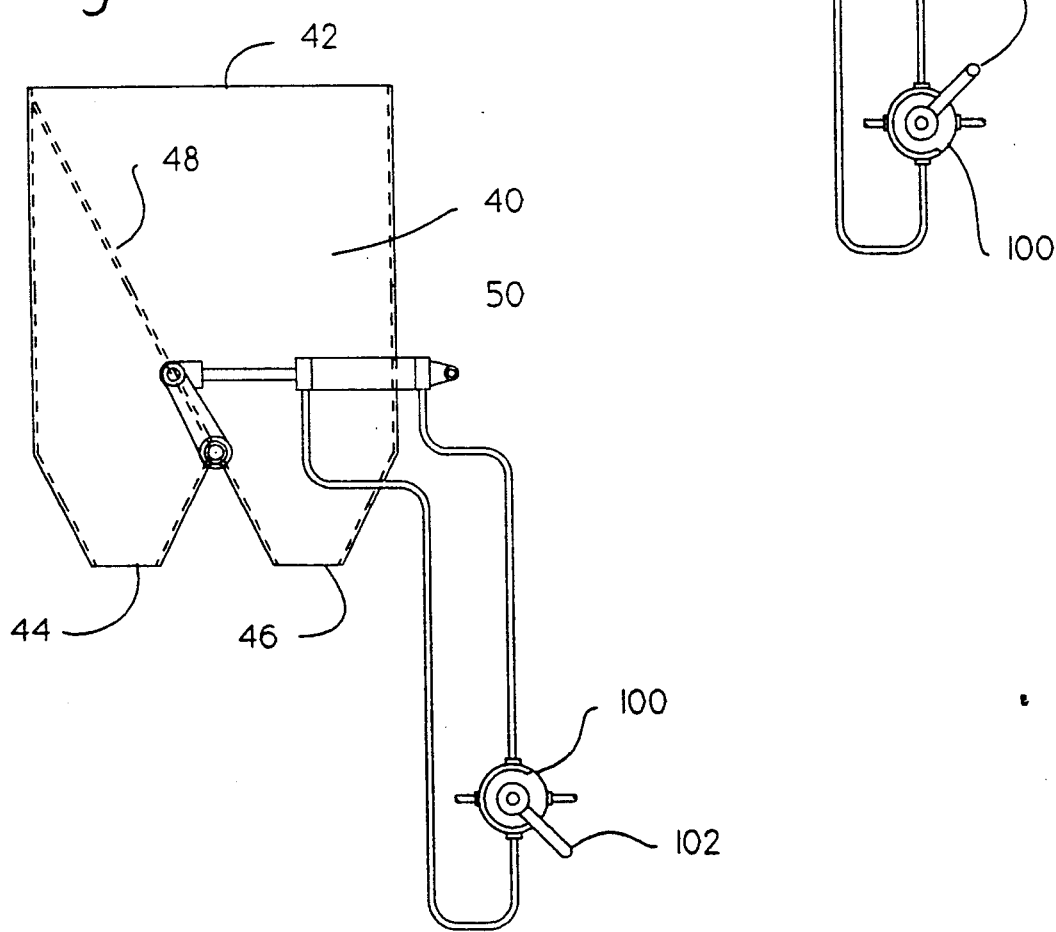

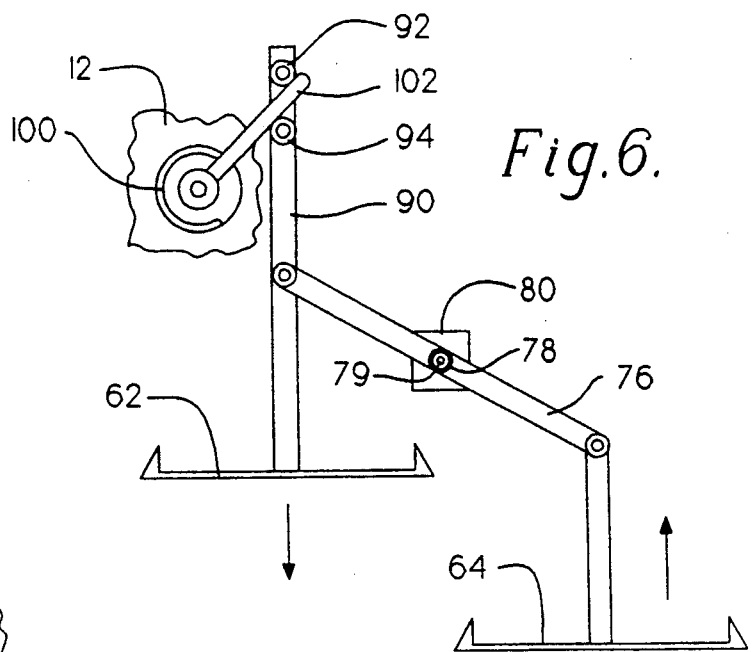
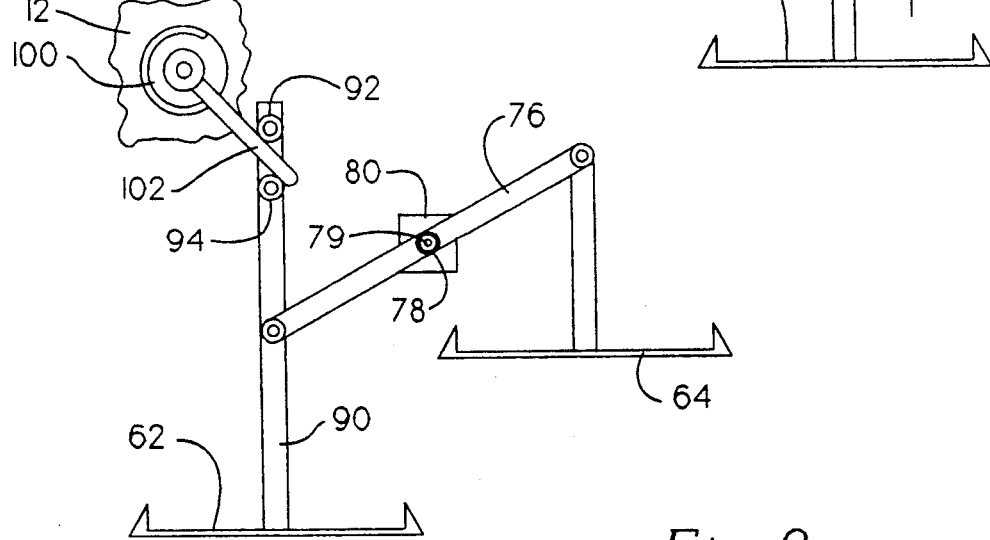
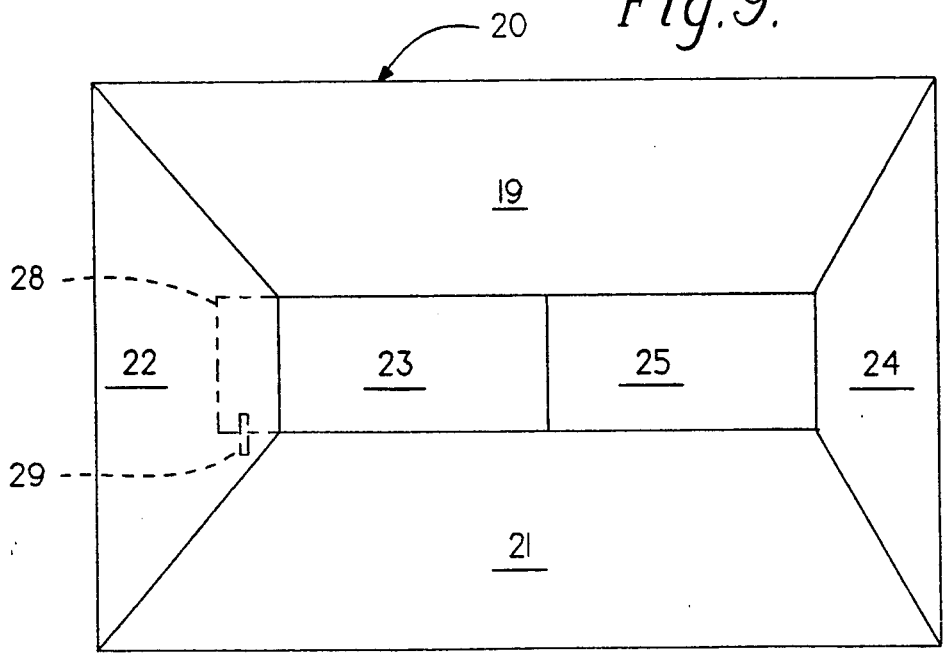

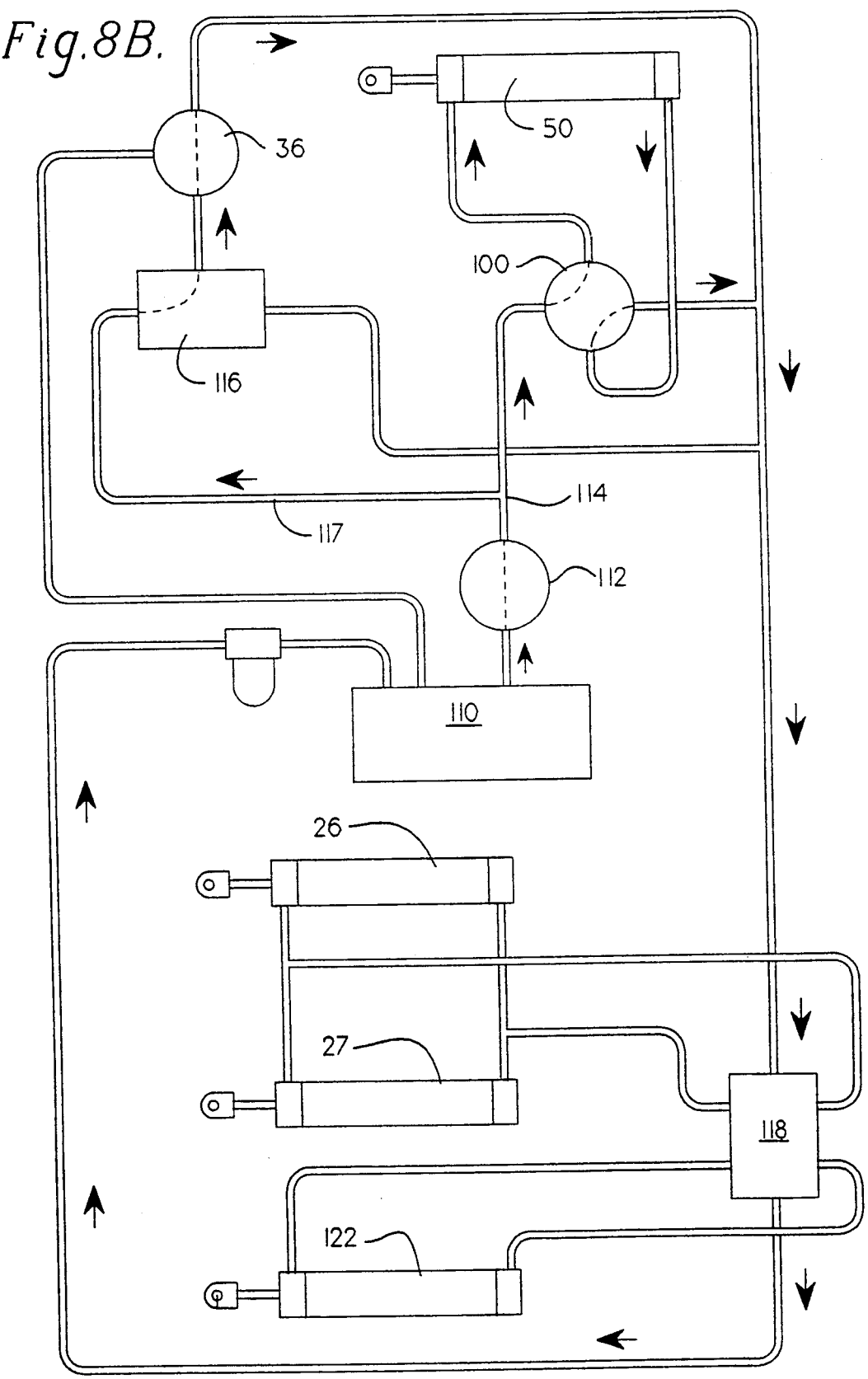

PORTABLE APPARATUS FOR FILLING BAGS WITH MATERIAL TO A PRESELECTED WEIGHT

BACKGROUND OF THE INVENTION

1. Field of the Invention

This invention relates to an apparatus for filling bags with sand, dirt, or other similar material.

2. Description of the Invention Background

Sandbags are needed for many uses such as erosion control, flood control, and military fortifications. Another use of sandbags is for supporting a pipeline in a trench prior to backfilling the trench. With an oil or gas pipeline which stretches for miles, sometimes up to 100,000 sandbags per mile are needed to support the pipe and prevent the underside of the pipe from contacting rocks on the bottom of the trench which could damage the pipe, and for erosion control on hillsides.

Sandbags needed for flood control are often needed in large numbers and must be prepared under adverse conditions. The same may be true for military fortifications. The need for speed has led to the development of bag filling apparatus of the type disclosed in U.S. Pat. No. 4,585,041 which provides for a plurality of chutes enabling a plurality of bags to be filled simultaneously. Multiple bagging chutes are also found in U.S. Pat. No. 3,552,346 directed to a Sand-Bagging Attachment for Dump Trucks. The apparatus of the aforementioned patents suffer from several drawbacks. First, workers are required to visually determine when a sandbag has reached a desired fullness. Additionally, such apparatus provide for the workers to manually interrupt the flow of sand to the bags. That results in bags which are often under or over filled. That also provides an opportunity for workers to slow the bag filling operation. Therefore, it is desirable to have a bag filling apparatus which automatically interrupts the flow of material to the bag when the bag has reached a desired fullness and begins to fill the next bag automatically for a continuous bag filling operation.

BRIEF SUMMARY OF THE INVENTION

The present invention is directed to a portable bag filling apparatus which provides for continuous, automatic filling of bags to a preselected weight. The apparatus includes a hopper for receiving material. The hopper feeds the material downward to an opening in the bottom of the hopper and on to a conveyor belt for transporting the material to a bagging head. An adjustable depth gate adjacent the forward side of the hopper regulates the depth of material deposited on the conveyor.

The bagging head includes a gate having two positions for directing the material to one of a first and second outlet ports. Underneath the bagging head is a receiving scale having first and second interconnected pans and a movable counterweight which by means of a wheel, rolls along a counterweight rod. Each pan is adapted to support a bag to be filled. The scale is constructed so that it may move between alternate positions: a first position wherein the first pan is adjacent the first outlet port and the counterweight is adjacent the second pan and a second position wherein the second pan is adjacent the second outlet port and the counterweight is adjacent the first pan. The movement of the receiving scale occurs automatically when the sandbag reaches a preselected weight. When the weight of the material in the bag on the first pan exceeds a preselected value, the weight of the material is sufficient to overcome the counteracting forces of friction and the counterweight. When that occurs, the first pan moves away from the first outlet port and the second pan moves toward the second outlet port, and the counterweight moves to the position adjacent the first pan.

The movement of the receiving scale actuates a hydraulic rotary valve through a mechanical linkage which in turn actuates a hydraulic cylinder connected to the gate in the bagging head. The cylinder causes the gate to shift positions and direct material to the second outlet port. If desired, the conveyor belt's movement may be temporarily interrupted during movement of the receiving scale thus stopping the flow of material to the bagging head. Once the receiving scale has stopped its movement, the conveyor belt's movement is restored thus restarting the flow of material to the bagging head.

When the second bag reaches a preselected weight, it begins a downward movement which returns the first pan to a position adjacent the first outlet port. By this time, however, the previously filled bag has been removed and a new empty bag positioned on the first pan. Thereafter, the cycle is repeated automatically.

If desired, a double unit can be constructed having two conveyors adjacent one another. Each conveyor would deliver material to one of two bagging heads which in turn would have their own corresponding receiving scales. The double unit would have a common power source and hopper and be mounted on a single frame but would have independent hydraulic systems sharing a single pump.

The bag filling apparatus of the present invention overcomes the deficiencies of the prior art. Each bag is automatically filled to the same preselected weight. The flow of material stops while the filled bag is removed and an empty bag is placed on the pan. The flow of material then automatically restarts. Thus, the vagaries caused by different operators as well as potential slowdowns in the bag filling operation are avoided. Those and other advantages and benefits of the present invention will become apparent from the Description of the Preferred Embodiment hereinbelow.

DESCRIPTION OF THE DRAWINGS

For the present invention to be readily practiced and easily understood, it will be described, by way of example only, in conjunction with a preferred embodiment in which:

FIG. 4 is a diagrammatic representation of the bagging head and rotary valve of the present invention with the receiving scale in the first position;

FIG. 5 is another diagrammatic representation of the bagging head and rotary valve of the present invention with the receiving scale in the second position;

FIG. 6 is a diagrammatic representation of the receiving scale and rotary valve of the present invention shown in the first position;

FIG. 7 is a diagrammatic representation of the receiving scale and rotary valve of the present invention shown in the second position;

FIGS. 8, 8A and 8B are schematic representations of the hydraulic system of the present invention; and FIG. 9 is a top view looking down into the hopper of the present invention.

DESCRIPTION OF A PREFERRED EMBODIMENT

Figure 1:
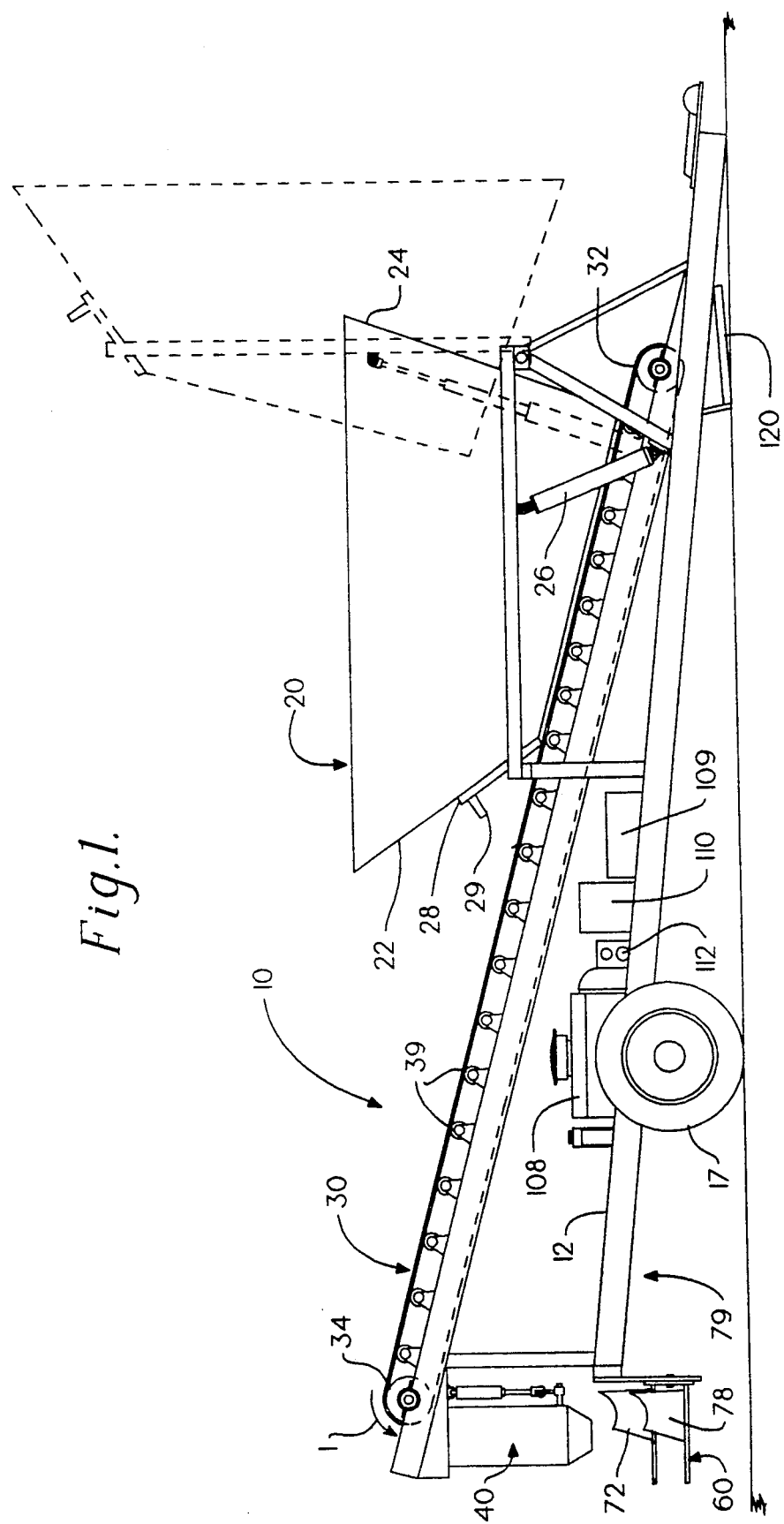
FIG. 1 is a side elevational view of the bag filling apparatus of the present invention.

FIGS. 1-9 illustrate a preferred embodiment of the present invention. In FIG. 1, a portable bagging apparatus 10 constructed according to the teachings of the present invention is shown. The apparatus includes a frame 12, a hopper 20, a conveyor 30, a bagging head 40 and a receiving scale 60.

Figure 2:
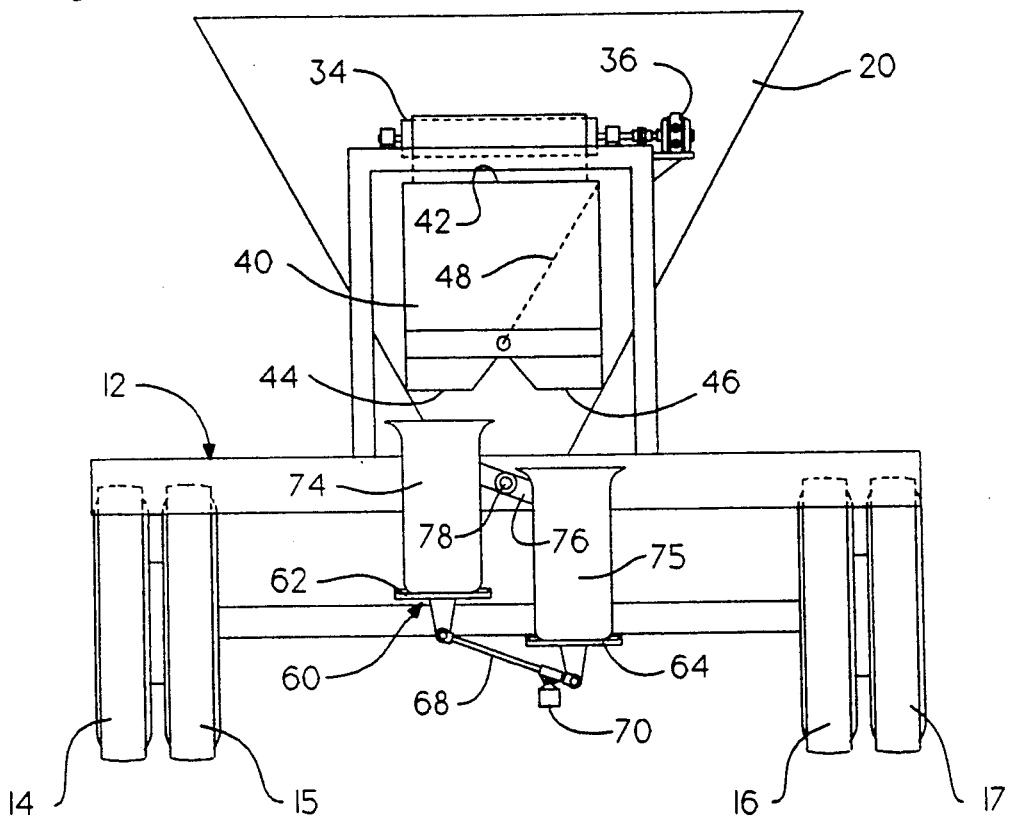
FIG. 2 is a rear elevational view of the apparatus of FIG. 1 showing the receiving scale in a first position.

The frame 12 is supported by wheels 14, 15, 16 and 17, shown in FIG. 2, and a hydraulically actuated stabilizer/landing gear 120. The stabilizer/landing gear 120 can be hydraulically extended and retracted by hydraulic cylinder 122 shown in FIG. 8. The frame 12, and support means for the frame may be of various constructions as will be recognized by one skilled in the art. The configuration of wheels 14, 15, 16 and 17 and stabilizer/landing gear 120 are shown for illustration purposes only.

The hopper 20 is provided for receiving material and is mounted on the frame 12. Hopper 20 has sloped side portions 19, 21, 22 and 24 for downwardly directing the material that it receives. The hopper 20 has an opening 23 partially across its bottom 25 (FIG. 9) to allow material to flow out of the hopper 20. Some material may accumulate on the bottom of the hopper 25. Preferably, the hopper 20 is pivotable by means of hydraulic cylinders 26 and 27 (FIGS. 1 and 8) so that the material that accumulates within the hopper 20 may be dumped by pivoting the hopper 20 to the position shown in phantom in FIG. 1. The hopper 20 also includes a depth gate 28 adjacent side portion 22 for adjusting the depth of material deposited on the conveyor as described hereinbelow.

Underneath the hopper 20 is a conveyor 30 for transporting the material from the hopper 20 to the bagging head 40. The conveyor 30 has a tail pulley 32 and a head pulley 34. The head pulley 34 is driven by a hydraulic motor 36 (FIG. 8) in the direction of arrow 1 in FIG. 1, and its speed is adjustable, as is well known in the art. The conveyor 30 is comprised of a belt 38 which rests on rollers 39 to allow the conveyor belt 38 to transport material from the hopper 20 to the bagging head 40. The depth gate 28 is slidably mounted on side portion 22 and is moved by a handle 29. The depth gate 28 may slide along side portion 22 in a direction toward and away from conveyor belt 38. The position of depth gate 28 determines the depth of material deposited on the conveyor belt 38. The depth of material deposited on the conveyor belt 38 will be equal to the distance between the depth gate 28 and the conveyor belt 38. When the depth gate 28 is in close proximity to the conveyor belt 38, a thin layer of material is deposited on the conveyor belt 38. When the depth gate 28 is moved farther away from the conveyor belt 38 by handle 29, a thicker layer of material will be deposited on the conveyor belt 38.

Figure 3:
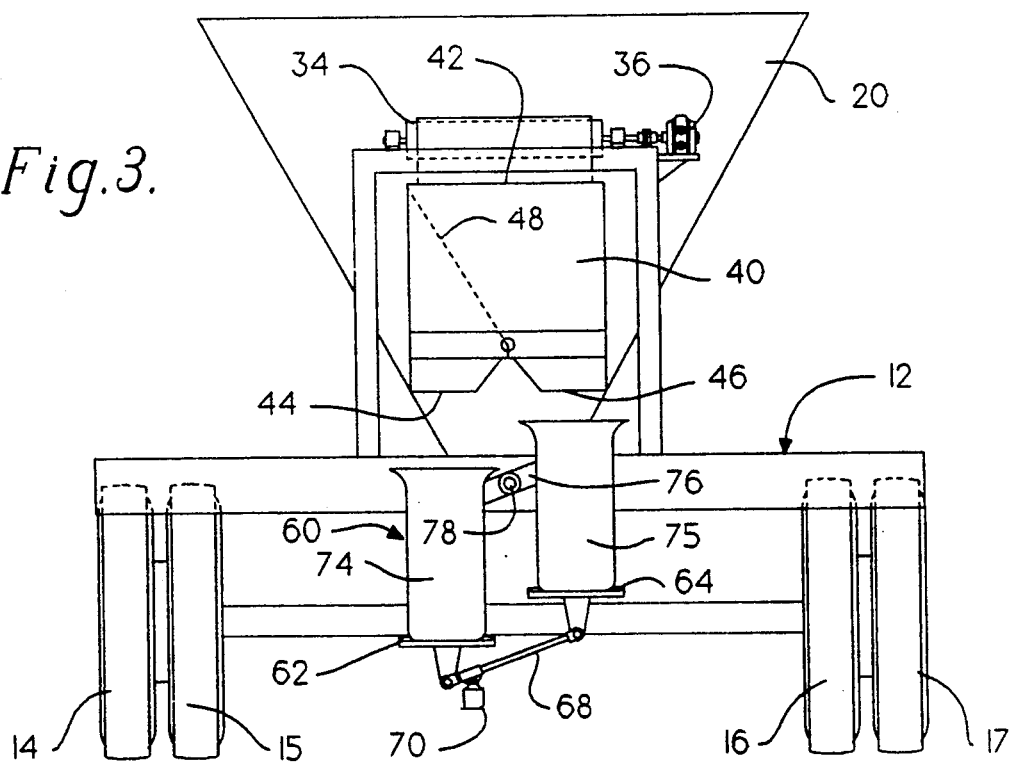
FIG. 3 is a rear elevational view of the apparatus of FIG. 1 showing the receiving scale in a second position.

The bagging head 40, as shown in FIGS. 2 and 3, has an inlet port 42, a first outlet port 44 and a second outlet port 46. A gate 48, within the bagging head 40, has alternate positions: a first position (FIG. 2 or FIG. 4) where material is directed to the first outlet port 44, and a second position (FIG. 3 or FIG. 5) where material is directed to the second outlet port 46. The position of the gate 48 is controlled by a hydraulic cylinder 50, as shown in FIGS. 4 and 5.

Underneath the bagging head 40 is a receiving scale 60 (FIGS. 2, 3, 6 and 7). The receiving scale 60 has a first scale table or pan 62 interconnected with a second scale table or pan 64. The receiving scale 60 has alternate positions: a first position, as shown in FIG. 2, wherein first pan 62 is adjacent the first outlet port 44 and a second position, as shown in FIG. 3, wherein the second pan 64 is adjacent the second outlet port 46.

A counterweight rod 68 (FIGS. 2 and 3) is pivotally connected between pans 62 and 64. Movably disposed on counterweight rod 68 (FIGS. 2 and 3) is counterweight 70. The counterweight 70, in its at rest positions, is located adjacent whichever pan 62, 64 is in a position furthest away from its corresponding outlet port. Thus, in the first position as shown in FIG. 2, the counterweight 70 is located beneath second pan 64 and, in the second position, as shown in FIG. 3, the counterweight 70 is located beneath the first pan 62. The counterweight 70 may be of any preselected weight to yield a desired bag weight. By varying the weight of the counterweight 70, the amount of material delivered to the bags can be adjusted.

Referring to FIGS. 6 and 7, the receiving scale 60 is mounted on the apparatus frame 12 by means of a walking beam 76. The walking beam 76 is rigidly connected to pin 78 which is pivotally connected to the frame 12 by means of a bearing and bearing mount 80. Connected to the pan 62 is a control bar 90. Control bar 90 has rollers 92 and 94 spaced apart from one another and positioned perpendicular to control bar 90. An open center rotary valve 100 is carried on frame 12 and is controlled by a lever 102. When pans 62 and 64 move in the direction of the arrows in FIG. 6, lever 102 moves from a first position, through a transitional position (not shown), to a second position seen in FIG. 7, by interaction with rollers 92 and 94. Movement of lever 102 from its first position (FIG. 6) to its second position (FIG. 7) causes hydraulic fluid flow to the hydraulic cylinder 50 to move the gate 48 from its first to its second position. While the gate 48 is in motion, the rotary valve 100 and hydraulic circuitry may be constructed in such a manner that the hydraulic fluid flow to the motor 36 is interrupted. Therefore, while the gate 48 is in motion, the flow of material to the bagging head 40 is interrupted. Hydraulic flow to the motor 36 resumes when the gate 48 has reached either the first or second position.

Referring to FIG. 2, as material flows through the bagging head 40 and out of the outlet port 44, a bag 74, which is held in an open position by a loom 72 and by the bag handler (not shown), fills with material. When the bag 74 reaches a preselected weight, the weight of the material is sufficient to counteract the forces of friction and the counterweight 70 so that the pan 62, which is connected to frame 12 by walking beam 76, pivots about pivot axis 79. As the pan 62 moves away from the outlet port 44, the pan 64 moves toward outlet port 46. As that occurs, the counterweight 70 moves along the counterweight rod 68 to the opposite end of the counterweight rod 68.

Referring to FIG. 3, as material flows through the bagging head 40 and out of outlet port 46, the bag 75, which is held in an open position by a loom 73 and by the bag handler (not shown), fills with material. When the bag 75 reaches a preselected weight, the weight of the material is sufficient to counteract the forces of friction and the counterweight 70 so that the pan 64, which is connected to frame 12 by walking beam 76, pivots about pivot axis 79. As the pan 64 moves away from the outlet port 46, the pan 62 moves toward the outlet port 44. After the receiving scale 60 returns to the first position illustrated in FIG. 2, the filling operation is repeated as described above.

Figure 8:
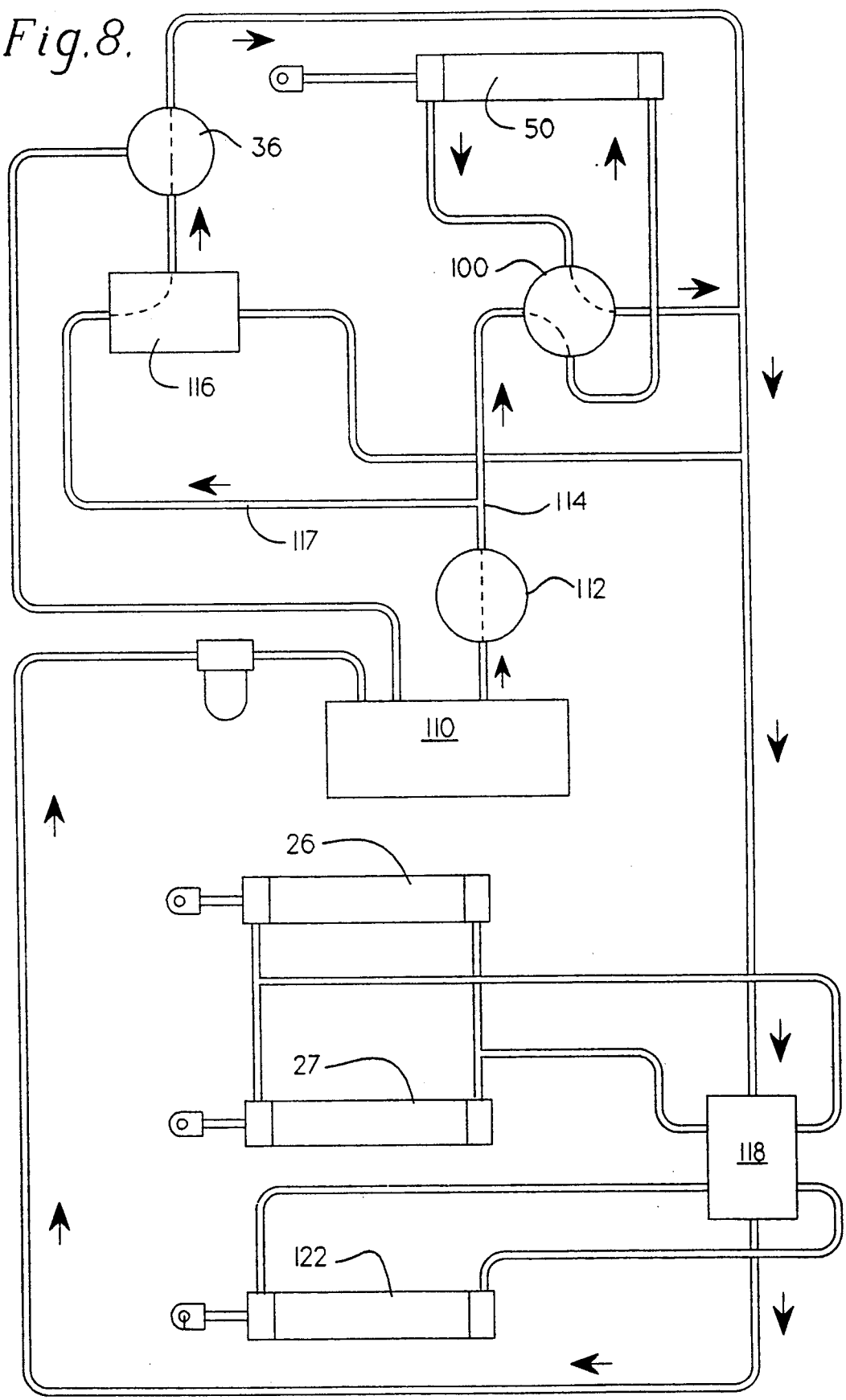
Figure 8A:
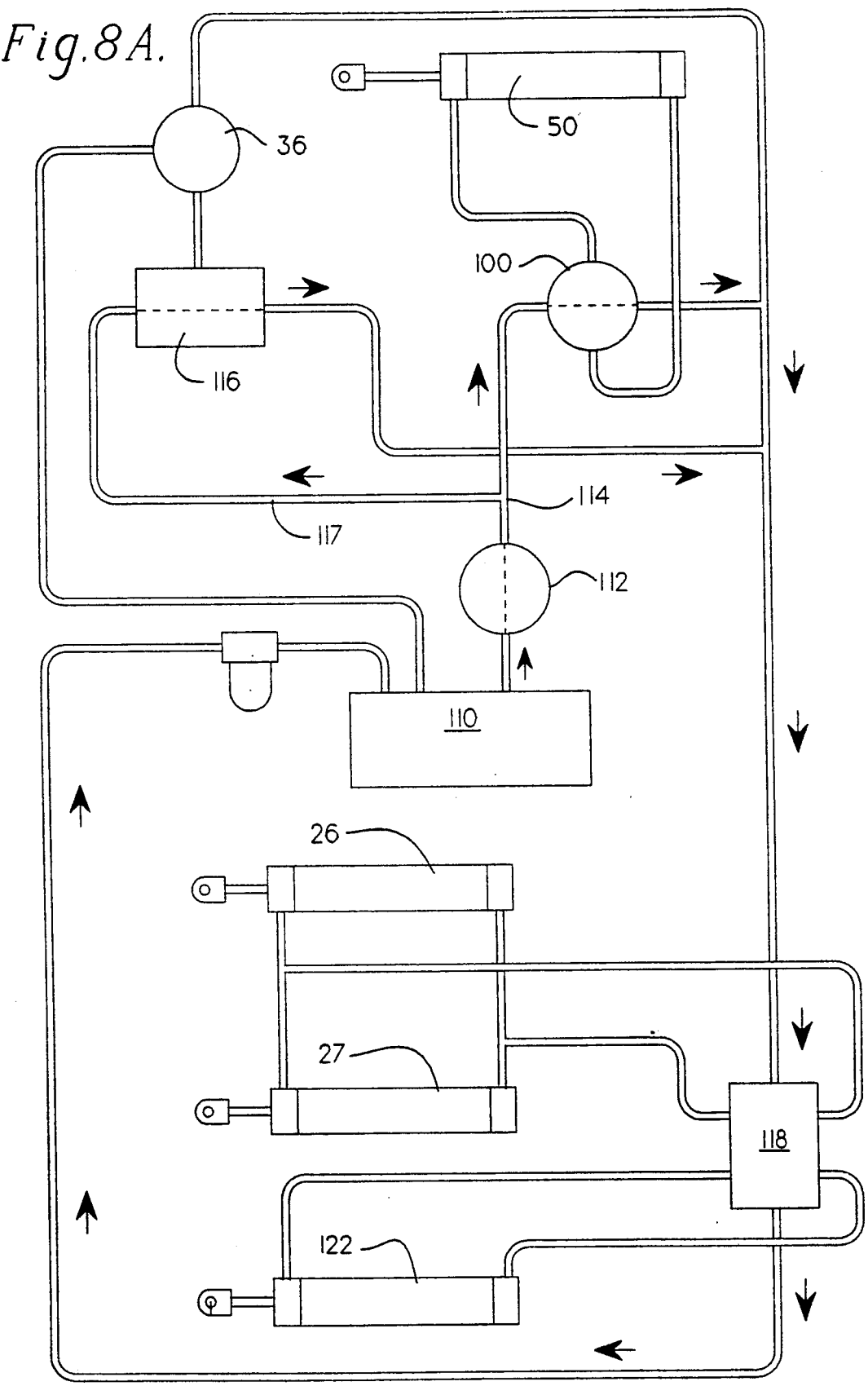

FIGS. 8, 8A and 8B illustrate a schematic representation of the hydraulic system 104 of the bag filling apparatus 10 where hydraulic fluid flow through the system 104 is represented by arrows. The hydraulic system is powered by an engine 108 which operates pump 112. The engine draws its fuel supply from fuel tank 109. A tank or reservoir 110 supplies a source of hydraulic fluid for the system 104. The pump 112 pressurizes the hydraulic system 104. Hydraulic fluid flows from the tank 110 to "tee" 114 where the flow branches off into two directions. Flow in one direction is to the rotary valve 100 and flow in the other direction is through a line 117 to the control valve 116 and then continuing to the conveyor motor 36.

The rotary valve 100 has three positions: a first position wherein the bagging head cylinder 50 is actuated in one direction (FIG. 8), a second transitional position wherein the hydraulic line 117 is momentarily depressurized while the receiving scales shift and while the bagging head cylinder moves from being actuated in one direction to being actuated in an opposite direction (FIG. 8A), and a third position wherein the bagging head cylinder 50 is actuated in the opposite direction (FIG. 8B).

In FIG. 8A, while the bagging head cylinder 50 is in transition, the rotary valve 100 due to its open center creates an open line between points 124 and 126. Since the fluid is free to flow through the rotary valve 100, line 117 becomes depressurized and the motor 36 stops moving the conveyor belt 38.

Once the rotary valve 100 reaches its other position, as shown in FIG. 8B, there is no longer a hydraulic communication between points 124 and 126, head cylinder 50 reaches its other position, and the hydraulic line 117 is again pressurized thus restarting the flow of material to the bagging head.

Hydraulic fluid also flows to both the hydraulic cylinders 26 and 27 which allows for ejection of material from the hopper 20 and to stabilizer cylinder 122. Control valve 118 receives returning hydraulic fluid from control valve 116. Control valve 118 controls both actuation of the hydraulic cylinders 26 and 27 and hydraulic cylinder 122 in a conventional manner.

The apparatus of the present invention is capable of filling 18 to 22 bags per minute to a uniform weight of 45 to 55 lbs. up to approximately 90 lbs. Thus, the present invention provides for the rapid filling of bags to a uniform weight.

While the present invention has been described in conjunction with a preferred embodiment, many modifications and variations will be readily apparent to those of ordinary skill in the art. For example, the mechanical scale and hydraulic linkage to the hydraulic system could be replaced with an electronic scale and electronically controlled hydraulic, electric or pneumatic conveyor and gate actuators. Additionally, the counterweight could be replaced with a tube partially filled with heavy fluid or dry weight material and connected to the receiving scales, thereby creating another method of adjustable control of the filled bag weight. Such modifications are well within the skill of one skilled in the art. This disclosure and the following claims are intended to cover all such modifications and variations.

What I claim is:

1. An apparatus for filling a bag with material, comprising:
    a frame;
    means for receiving material mounted on said frame;
    a bagging head mounted on said frame and having a first and a second outlet ports;
    means for transporting the material from said means for receiving material to said bagging head;
    means, located in said bagging head, for selectively diverting material to one of said first and second outlet ports;
    a receiving scale pivotally mounted on said frame and having first and second interconnected pans and a movable counterweight associated therewith, said receiving scale being capable of assuming alternate positions, a first position wherein said first pan is adjacent said first outlet port and said counterweight is adjacent said second pan, and a second position wherein said second pan is adjacent said second outlet port and said counterweight is adjacent said first pan, each of said pans adapted to hold a bag for receiving material discharged from one of said outlet ports;
    actuation means, responsive to said first and second positions, for operating said means for selectively diverting material; and
    means for dumping material from said means for receiving which material has not been transported by said means for transporting.

2. The apparatus of claim 1 wherein said means for dumping includes a hydraulic cylinder adapted for pivoting said means for receiving such that material is dumped from said means for receiving.

3. The apparatus of claim 1 wherein the weight of said counterweight determines the amount of material delivered from each of said first and second outlet ports, and wherein the weight of said counterweight is selectable so that the amount of delivered material may be selected.

4. An apparatus for filling a bag with material, comprising:
    a frame;
    means for receiving material mounted on said frame;
    a bagging head mounted on said frame and having a first and a second outlet ports;
    means for transporting the material from said means for receiving material to said bagging head;
    means, located in said bagging head, for selectively diverting material to one of said first and second outlet ports;
    a receiving scale pivotally mounted on said frame and having first and second interconnected pans and a movable counterweight associated therewith, said receiving scale being capable of assuming alternate positions, a first position wherein said first pan is adjacent said first outlet port and said counterweight is adjacent said second pan, and a second position wherein said second pan is adjacent said second outlet port and said counterweight is adjacent said first pan, each of said pans adapted to hold a bag for receiving material discharged from one of said outlet ports; and
    actuation means, responsive to said first and second positions, for operating said means for selectively diverting material, said actuation means including a hydraulic cylinder, operatively connected to said means for selectively diverting material, for positioning said means for selectively diverting material; and a hydraulic rotary valve, operatively connected to said hydraulic cylinder, said hydraulic rotary valve actuated by movement of said receiving scale between said first and second positions.

5. An apparatus for filling a bag with material, comprising:

a frame;

means for receiving material mounted on said frame;

a bagging head mounted on said frame and having a first and a second outlet ports;

means for transporting the material from said means for receiving material to said bagging head, said means for transporting including a hydraulically driven conveyor belt;

means, located in said bagging head, for selectively diverting material to one of said first and second outlet ports;

a receiving scale pivotally mounted on said frame and having first and second interconnected pans and a movable counterweight associated therewith, said receiving scale being capable of assuming alternate positions, a first position wherein said first pan is adjacent said first outlet port and said counterweight is adjacent said second pan, and a second position wherein said second pan is adjacent said second outlet port and said counterweight is adjacent said first pan, each of said pans adapted to hold a bag for receiving material discharged from one of said outlet ports;

actuation means, responsive to said first and second positions, for operating said means for selectively diverting material including a hydraulic cylinder, operatively connected to said means for selectively diverting material, for positioning said means for selectively diverting material; and a hydraulic rotary valve, operatively connected to said hydraulic cylinder, responsive to said first and second positions of said receiving scale, and wherein said rotary valve interrupts said conveyor belt when said receiving scale is moving between said first and second positions.

6. An apparatus for filling a bag with material, comprising:

a frame;

means for receiving material mounted on said frame;

a bagging head mounted on said frame and having a first and a second outlet ports;

means for transporting the material from said means for receiving material to said bagging head;

a depth gate mounted to said means for receiving material above said means for transporting the material for adjusting the flow of material to said bagging head;

means, located in said bagging head, for selectively diverting material to one of said first and second outlet ports;

a receiving scale pivotally mounted on said frame and having first and second interconnected pans and a movable counterweight associated therewith, said receiving scale being capable of assuming alternate positions, a first position wherein said first pan is adjacent said first outlet port and said counterweight is adjacent said second pan, and a second position wherein said second pan is adjacent said second outlet port and said counterweight is adjacent said first pan, each of said pans adapted to hold a bag for receiving material discharged from one of said outlet ports; and actuation means, responsive to said first and second positions, for operating said means for selectively diverting material.

* * * * *